(12) United States Patent
Schmidt et al.

(10) Patent No.: US 8,322,499 B2
(45) Date of Patent: Dec. 4, 2012

(54) DAMPING VALVE FOR A HYDRAULIC SHOCK ABSORBER

(75) Inventors: Klaus Schmidt, Odenthal (DE); Wolfgang Hamers, Juelich (DE)

(73) Assignee: Thyssenkrupp Bilstein Suspension GmbH, Ennepetal (DE)

( * ) Notice: Subject to any disclaimer, the term of this patent is extended or adjusted under 35 U.S.C. 154(b) by 812 days.

(21) Appl. No.: 12/405,311

(22) Filed: Mar. 17, 2009

(65) Prior Publication Data
US 2009/0236193 A1 Sep. 24, 2009

(30) Foreign Application Priority Data
Mar. 20, 2008 (DE) .................. 10 2008 015 415

(51) Int. Cl.
*F16F 9/34* (2006.01)

(52) U.S. Cl. ............... 188/322.13; 188/267; 251/129.01

(58) Field of Classification Search ............ 188/322.13, 188/322.2, 322.22, 267, 267.2; 251/129.01, 251/129.07, 129.15
See application file for complete search history.

(56) References Cited

U.S. PATENT DOCUMENTS

| | | | | |
|---|---|---|---|---|
| 5,386,893 | A * | 2/1995 | Feigel | 188/266.5 |
| 5,651,433 | A * | 7/1997 | Wirth et al. | 188/266.6 |
| 5,735,372 | A * | 4/1998 | Hamilton et al. | 188/266.6 |
| 6,035,979 | A * | 3/2000 | Forster | 188/266.6 |
| 6,607,175 | B1 * | 8/2003 | Nguyen et al. | 251/63.5 |
| 2005/0121273 | A1 | 6/2005 | Hamers | 188/322.2 |

FOREIGN PATENT DOCUMENTS

DE 004445705 A1 * 6/1996

* cited by examiner

*Primary Examiner* — Pamela Rodriguez
(74) *Attorney, Agent, or Firm* — Andrew Wilford

(57) ABSTRACT

The invention relates to a flow-control valve (1) for a hydraulic shock absorber. Components of the basic structure of the flow-control valve (I) are an axially movable slide (5) having a body (6) and a valve sleeve (7), an electromagnetic linear actuator (8) for axial displacement of the slide (5) and a fixed guide body (9) configured as a tube and having an end pin (10). The valve sleeve (7) is guided on the end pin (10) of the guide body (9) and cooperates with at least one valve opening (11) formed in the wall of the guide body (9) such that the flow cross section of the valve opening (11) can be altered by axial movement of the valve body (7). According to the invention the slide (5) is provided in a pole tube (12) fixed on the guide body (9). The body (6) of the slide (5) is guided with a clearance fit in a bearing ring (13) attached to a section of the pole tube (12) surrounding the body (6).

18 Claims, 2 Drawing Sheets

DAMPING VALVE FOR A HYDRAULIC SHOCK ABSORBER

FIELD OF THE INVENTION

The invention relates to a flow-control valve for a hydraulic shock absorber with an axially movable slide having a body and a valve sleeve, with
- an electromagnetic linear actuator for axial displacement of the slide, and
- a fixed guide body, which is configured as a tube and has an end pin, the valve sleeve being guided on the end pin of the guide body and cooperating with at least one valve opening formed in the wall of the guide body such that the flow cross section of the valve opening can be altered by axial movement of the valve body. The flow-control valve can be provided in a housing having a flow inlet and a flow outlet and can be attached as a so-called "backpack valve" on the outside of a hydraulic shock absorber. The flow inlet and outlet of the housing are connected hydraulically to compartments of the shock absorber. When the slide is actuated the damping force of the hydraulic shock absorber can be changed steplessly. If two flow-control valves are assigned to one shock absorber it is then possible to independently control the damping forces in during compression and extension of the shock absorber.

BACKGROUND OF THE INVENTION

A flow-control valve with the above-described type is known from EP 1 538 366 The slide of the known design is guided in the region of the thin-wall tubular valve body. The body of the control valve is surrounded with clearance by a housing part that is not connected to the guide body. Between the compartment inside the tube and a compartment surrounding the valve body there are considerable differences in pressure whose size is dependent on the functional position of the piston movement of the shock absorber. As a result of the differences in pressure substantial fluctuating radial forces, which have to be absorbed by the guiding or respectively bearing of the slide, act on the slide. These disturbing forces acting radially on the slide hamper exact control movement and positioning of the valve body. Against this background there is a requirement to improve the guiding and bearing of the slide.

OBJECT OF THE INVENTION

The object of the invention is to structurally modify a flow-control valve having the above-described characteristics such that defined and precise control movements of the slide are assured under all operating conditions.

SUMMARY OF THE INVENTION

This object is attained according to the invention by the slide being mounted in a pole tube that is fixed on the guide body, and by the body of the slide being guided with a clearance fit in a bearing ring that is fixed on a section of the pole tube surrounding the body. According to the invention the body of the slide is guided on an additional bearing configured as a bearing ring and surrounding the body of the slide with a clearance fit, preferably a narrow clearance fit such as for example a H7/g6 fit according to ISO DIN 7157. The inventive clearance fit between the bearing ring and the body of the slide presupposes that the bearing defined by the bearing ring and the bearing for guiding the valve sleeve on the end pin of the guide body are exactly aligned. For this, the pole tube makes a contribution essential to the invention. The pole tube is supported on the guide body and fixed thereon, guaranteeing defined positioning of the bearing ring surrounding the body and the bearing on the pilot pin of the guide body. Fixing the pole tube onto the guide body must be done with a fitting surface and play-free. Fastening by means of a thread is less suitable due to the thread clearance. The pole tube is preferably affixed with a force fit or a transition fit on fitting surfaces of the guide body, whereby the fit can be carried out for example as H7/g7-fit (ISO DIN 7157). Insofar as the pole tube is fixed on the guide body by means of a transition fit, the slide being guided both in the bearing ring and on the end pin of the guide body in each case with a clearance fit, for example a narrow H7/g6-fit with minimal radial clearance. The inventive bearing arrangement in combination with fixing the pole tube on the guide body preferably as a transition fit guarantees defined, precise control movement of the slide under all operating conditions. In terms of its production process, the inventive arrangement has the added advantage that the clearance fits, required for the sliding is movement of the slide, can be manufactured by lathing of the parts. Expensive subsequent finishing machining, common to the manufacture of seat valves, are not required.

The bearing ring for guiding the body effectively comprises nonmagnetizable low-friction material. Suitable examples are nonferrous heavy metals, in particular copper alloys. Other bearing materials however, e.g. ceramic materials or artificial carbon, are not out of the question.

The bearing ring is preferably provided between the end of the pole tube and an axially adjacent magnet core and can comprise a solder bonding the pole tube to the magnet core. The solder simultaneously forms the bearing ring and comprises a nonmagnetizable material, such that the pole tube and the magnet core are magnetically decoupled by the solder.

As an alternative to designing the bearing ring as an annular solder ring the bearing ring can also be formed by a metal ring of nonmagnetizable metal. Austenitic steel may be considered as nonmagnetizable metal, for example. The metal ring can be connected for example by laser or electron-beam welding to the pole tube on the one hand and to the magnet core on the other hand. The advantage of the above welding methods is that there is only very minimal heat input into the welded material such that is no disrupting heat deformation of the components and the required manufacturing tolerances can be adhered to.

The arrangement comprising the pole tube, the magnet core and the bearing ring is surrounded by a coil of the linear actuator. The bearing ring preferably has a substantially triangular or trapezoid cross-section whose narrow edge bears on the shaft of the actuating drive [sic; slide].

The pole tube and the guide body delimit an annular chamber in which the valve openings of the guide body open. The pole tube also has on its wall direct-flow apertures through which fluid can freely escape from the chamber. The valve openings of the guide body and the direct-flow apertures of the pole tube are dimensioned relative to one another such that the damping effect of the flow-control valve alone results from the throughflow of the valve openings. The damping force variation can be influenced by the shape of the valve openings. In accordance with a preferred design of the invention the valve openings have a heart-shaped contour extending out in the direction of closing of the slide from a point and merging through arcuate regions into flat portions to a wide outer end, all symmetrical to a symmetry axis through by the point. The direct-flow apertures of the surrounded pole tube are effectively configured as bores whose centers preferably pass through the symmetry axis of a valve opening of the guide body.

The body of the slide effectively has a pressure-equalization bore hydraulically connecting the compartment inside the valve sleeve to a compartment on the rear face of the body. The cylinder wall of the valve body is formed with at least one opening that in every functional position of the slide hydraulically connects the compartment inside the valve body to the annular chamber between pole tube and the guide body. The valve body effectively has a working edge configured as a blade.

In accordance with a further configuration of the inventive flow-control valve a passive check valve through which fluid can flow in only one direction and that blocking function is provided in the guide body. The passive flow-control valve can be provided on a cover provided with intake openings and that can be attached to the guide body.

BRIEF DESCRIPTION OF THE DRAWING

The invention will now be explained below by means of embodiments, in which.

DETAILED DESCRIPTION

Figure 1:
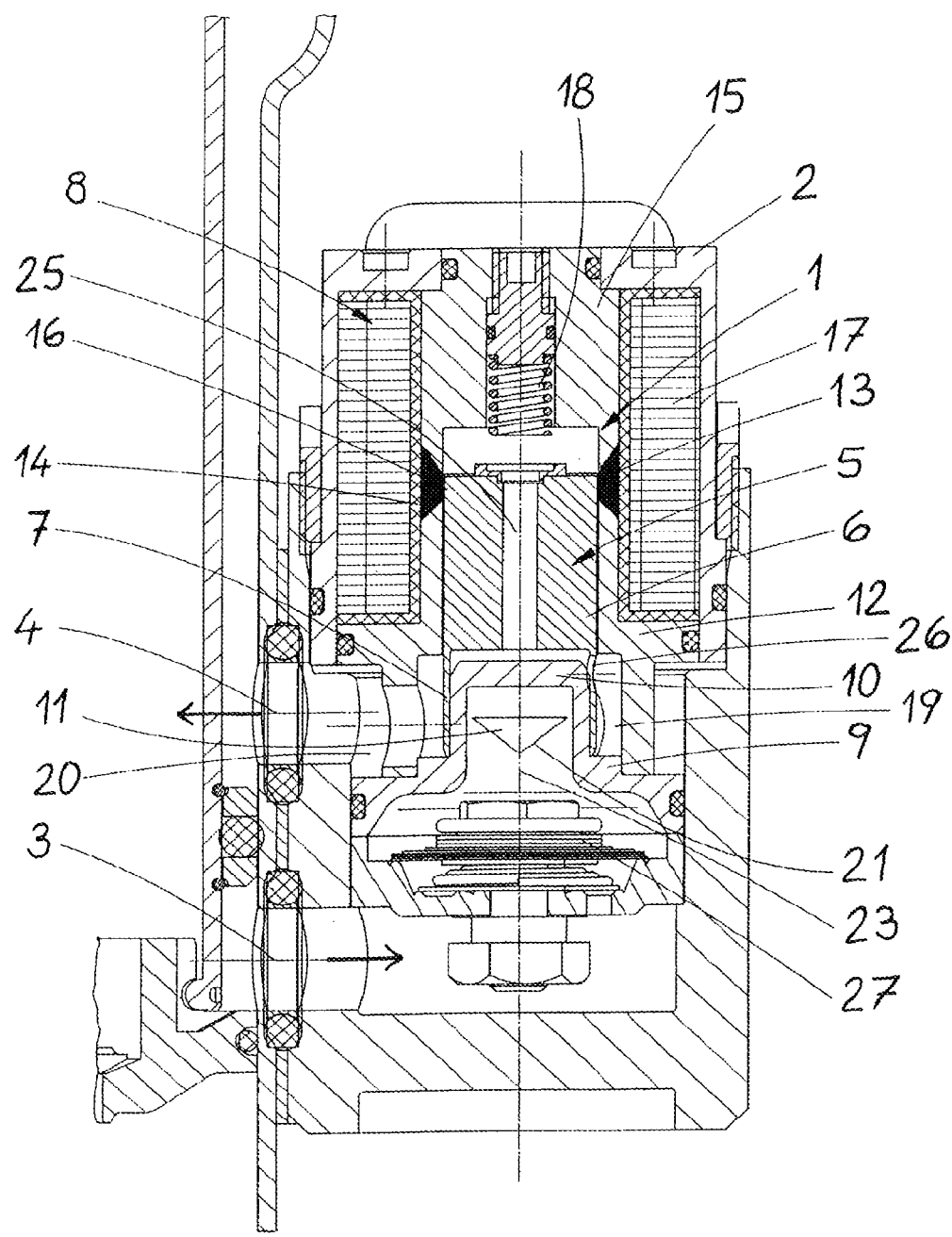
FIG. 1 schematically illustrates a longitudinal section through a flow-control valve for a hydraulic shock absorber, and FIG. 2 schematically illustrates an arrangement with two flow-control valves which are provided in a common housing and can be inserted to alter the damping forces in the compression and the nominal pressure of the shock absorber independently of one another.

The flow-control valve 1 illustrated in FIG. 1 is provided in a housing 2 having an inlet port 3 and an outlet port 4 for connecting to a hydraulic shock absorber. The housing 2 can have any shape.

The basic structure of the flow-control valve 1 illustrated in FIG. 1 includes an axially shiftable and preferably one-piece slide 5 having a shaft-shaped body 6 and a valve sleeve 7, an electromagnetic linear actuator 8 for axial displacement of the slide 5 and a fixed guide body 9 shaped as a tube and having an end pin 10. The valve sleeve 7 is guided on the end pin 10 of the guide body 9 and cooperates with valve openings 11 in the wall of the guide body 9 such that the flow cross section of the valve openings 11 is a function of the axial position of the valve body.

The slide 5 is mounted in a pole tube 12 radially fixed on the guide body 9. It is preferably fixed by a force fit or a transition fit on fitting surfaces of the guide body 11. The transition fit is for example a H7/g7-fit according to ISO DIN 7157.

The body 6 of the slide 5 is guided with a narrow clearance fit, for example a H7/g6 (ISO DIN 7157) fit in a bearing ring 13 fixed on a portion of the pole tube 12 surrounding the body 6. The slide 5 is guided with slight clearance both on the bearing ring 13 and toward the valve body on the end pin 10 of the guide body 9.

In the embodiment illustrated in FIG. 1 the bearing ring 13 is between the end of the pole tube 12 and an axially adjacent magnet core 15 and has a substantially triangular or trapezoid cross-section. The arrangement is selected such that the narrower inner edge 16 of the bearing ring 13 bears on the body 6 of the slide 5.

The bearing ring 13 is made of nonmagnetizable material such that the pole tube 12 and the magnet core 15 are magnetically decoupled. The bearing ring 13 can be made as a metal ring for example from austenitic steel or from a non-ferrous heavy metal. In this embodiment and according to a preferred configuration of the invention the bearing ring 13 is formed of solder that joins the pole tube 12 to the magnet core 15.

The assembly of the pole tube 12, the magnet core 15 and the bearing ring 13 is surrounded by a coil 17 contained in a shell 14 of the linear actuator 8. When current flows through the coil 17, the slide 5 is moved back against a compression spring 18 and the valve openings 11 formed in the wall of the guide body 9 are freed to an extent dependent on the travel. The flow-control valve is closed when there is no current flow.

FIG. 1 shows that the pole tube 12 and the guide body 9 define an annular chamber 19 into which the valve openings 11 of the guide body 9 open. The wall of the pole tube 12 has apertures 20 through which fluid can freely escape from the chamber 19. The valve openings 11 have a heart-shaped edge 21 which ends in the closing direction of the slide 5 at a point 22 and starting from the point 22 curve outward at 24 (FIG. 2) to a flat shape forming a wide opening to an axis 23 through the point. The direct-flow apertures 20 are configured as cylindrical bores whose center axes extend toward the symmetry axis 23 of a valve opening of the guide body 9.

The body of the slide 5 has a pressure-equalization bore 25 communicating between a compartment inside the valve sleeve 7 and a compartment at the rear face of the body 6. The cylindrical sleeve 7 is formed with at least one opening 26 that in every functional position of the slide 5 hydraulically connects the compartment inside the valve body to the annular chamber 20 between the hollow tube and the valve body.

Set into the guide body 9 is a check valve 27. Its flow direction is indicated in FIG. 1 by an arrow. Reversing the described check valve can alter the flow direction of the flow-control valve if required, if this is needed in practice. The passive check valve is provided on a cover provided with openings and attached to the guide body 6.

Figure 2:
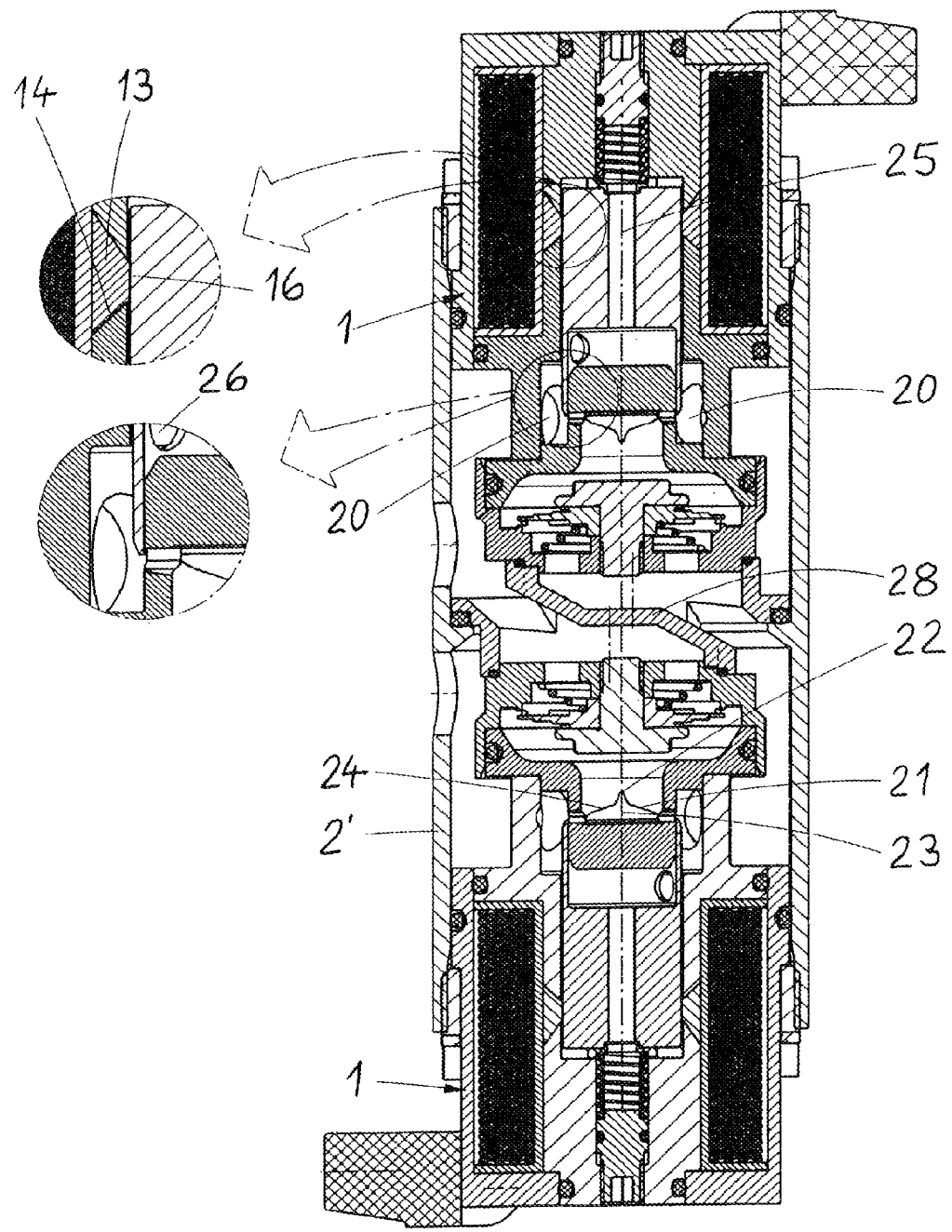

In the embodiment illustrated in FIG. 2 according to the invention two preferably structurally identical flow-control valves 1 are provided in a common housing 2' having an inlet port and an outlet port. Inside the housing 2' a flow guide element 28 is provided that separates two hydraulic chambers of the housing 2' from one another such that the damping fluid flowing into the first hydraulic space is conveyed to the first flow-control valve in the valve flow direction during retraction movement of the piston rod and the inflowing damping fluid goes to the second flow-control valve in the valve flow direction during extension movement of the piston rod into the second hydraulic space.

The invention claimed is:

1. A flow-control valve for a hydraulic shock absorber, the valve comprising
    an axially movable slide having a body and a valve sleeve,
    an electromagnetic linear actuator for axial displacement of the slide and having a coil, a magnetic core, and a pole tube,
    a fixed guide body configured as a tube, fixed in the pole tube, and having an end pin, the valve sleeve being guided on the end pin of the guide body and cooperating with at least one valve opening formed in the wall of the guide body such that the flow cross section of the valve opening can be altered by axial movement of the valve sleeve the slide being mounted in the pole tube axially adjacent the core, and
    a bearing rib guiding the body of the slide with a clearance fit and fixed on a section of the pole tube surrounding the body between an end of the pole tube and the magnet core, the pole tube, the magnet core, and the bearing ring being surrounded by the coil of the linear actuator.

2. The flow-control valve as claimed in claim 1 wherein the pole tube is fixed on fitting surfaces of the guide body with a transition fit or a force fit.

3. The flow-control valve as claimed in claim 1 wherein the slide is guided both in the bearing ring and on the end pin of the guide body in each case with a clearance fit.

4. The flow-control valve as claimed in claim 1 wherein the bearing ring is made of a low-friction material.

5. The flow-control valve as claimed in claim 1 wherein the bearing ring has a substantially triangular or trapezoid cross-section, with a narrow periphery of the bearing ring bearing on a shaft of the slide.

6. The flow-control valve as claimed in claim 5 wherein the body of the slide has at least one pressure-equalization bore that hydraulically connects the compartment inside the valve sleeve to a compartment on a rear abutting face of the body and in that in the cylinder wall of the valve sleeve at least one opening is formed that in every position of the slide hydraulically connects the compartment inside the valve body to the annular chamber between the pole tube and the guide body.

7. The flow-control valve as claimed in claim 1 wherein the valve sleeve has a working edge configured as a blade.

8. The flow-control valve as claimed in claim 1 wherein a passive check valve, through which fluid can flow in only one direction is provided in the guide body.

9. The flow-control valve as claimed in claim 8 wherein the passive check valve is provided on a cover provided with intake openings which can be attached to the guide body.

10. A flow-control valve for a hydraulic shock absorber with
an axially movable slide having a body and a valve sleeve,
an electromagnetic linear actuator for axial displacement of the slide, and
a fixed guide body configured as a tube and has an end pin, the valve sleeve being guided on the end pin of the guide body and cooperating with at least one valve opening formed in the wall of the guide body such that the flow cross section of the valve opening can be altered by axial movement of the valve sleeve the slide being mounted in a pole tube fixed on the guide body, and the body of the slide being guided with a clearance fit in a bearing ring fixed on a section of the pole tube surrounding the body, the pole tube and the guide body delimiting an annular chamber in which the valve opening of the guide body opens, and in that the pole tube has direct-flow apertures on its wall through which fluid can freely exit the chamber.

11. The flow-control valve as claimed in claim 10 wherein the valve openings have a heart-shaped contour terminating out in the direction of closing of the slide at a point and starting from the point extends arcuately symmetrically to a symmetry axis to a flat edge of a wide opening.

12. The flow-control valve as claimed in claim 11 wherein the direct-flow apertures are configured as bores having centers directed to the symmetry axis of a valve opening of the guide body.

13. A flow-control valve comprising:
a housing;
a guide body fixed in the housing and having a tubular end centered on an axis and formed with a radially through-going valve opening;
a slide axially shiftable in the housing and having a shaft part and a sleeve part extending axially from the shaft part and snugly surrounding and slidable on the guide-body end, the slide being axially shiftable between positions with the sleeve part completely blocking, partially blocking, and completely unblocking the valve opening;
an electromagnetic linear actuator in the housing having a coil, a magnetic core, and a pole tube axially offset from the core, the pole tube being fixed inside the coil and to the guide body and axially slidably supporting the shaft part of the slide; and
a bearing ring of nonmagnetizable material fixed in the housing, separating the magnetic core from the pole tube, and having an inner periphery radially engaging and guiding the shaft part.

14. The flow-control valve defined in claim 13 wherein the bearing ring is axially bonded on one side to the core and on the other side to the pole tube.

15. The flow-control valve defined in claim 14 wherein the bearing ring is an annular body of solder.

16. The flow-control valve defined in claim 15 wherein the solder body is of radially inwardly tapering cross section and has a narrow inner periphery bearing radially on the shaft and a wide outer periphery.

17. The flow-control valve defined in claim 13 wherein the body end and pole tube together form an annular chamber in which the sleeve part is movable, the housing being formed with an outlet port communicating with the chamber and an inlet port communicating with an interior of the guide body.

18. The flow-control valve defined in claim 13 wherein the valve opening is of an angular width increasing in one axial direction from a point.

* * * * *